US011444959B2

(12) United States Patent
Felke et al.

(10) Patent No.: US 11,444,959 B2
(45) Date of Patent: Sep. 13, 2022

(54) INTEGRATED EQUIPMENT FAULT AND CYBER ATTACK DETECTION ARRANGEMENT

(71) Applicant: Garrett Transportation I Inc., Torrance, CA (US)

(72) Inventors: Tim Felke, Damascus, MD (US); Rajneesh Kumar, Canton, MI (US); Balaji Arumugam, Marietta, GA (US); Gwenaelle Cheramy, Franklin, TN (US)

(73) Assignee: Garrett Transportation I Inc., Torrance, CA (US)

(*) Notice: Subject to any disclaimer, the term of this patent is extended or adjusted under 35 U.S.C. 154(b) by 379 days.

(21) Appl. No.: 16/682,727

(22) Filed: Nov. 13, 2019

(65) Prior Publication Data

US 2021/0258327 A1 Aug. 19, 2021

Related U.S. Application Data

(60) Provisional application No. 62/904,368, filed on Sep. 23, 2019, provisional application No. 62/784,374, filed on Dec. 21, 2018.

(51) Int. Cl.
| | |
|---|---|
| *H04L 9/40* | (2022.01) |
| *G06N 20/00* | (2019.01) |
| *G05B 23/02* | (2006.01) |
| *G06F 11/26* | (2006.01) |

(Continued)

(52) U.S. Cl.
CPC ...... *H04L 63/1416* (2013.01); *G05B 23/0243* (2013.01); *G05B 23/0251* (2013.01); *G05B 23/0283* (2013.01); *G06F 11/261* (2013.01); *G06F 21/55* (2013.01); *G06N 5/04* (2013.01); *G06N 20/00* (2019.01);
(Continued)

(58) Field of Classification Search
CPC ............. H04L 63/1416; H04L 63/1425; H04L 63/1433; H04L 63/1441; H04L 63/1408; G06F 21/55
See application file for complete search history.

(56) References Cited

U.S. PATENT DOCUMENTS

| | | | |
|---|---|---|---|
| 9,616,828 | B2 | 4/2017 | Ben Noon et al. |
| 9,686,294 | B2 | 6/2017 | Kantor et al. |
| 9,840,212 | B2 | 12/2017 | Ben Noon et al. |

(Continued)

*Primary Examiner* — Ali S Abyaneh
(74) *Attorney, Agent, or Firm* — Seager, Tufte & Wickhem, LLP

(57) ABSTRACT

An integrated vehicle health management (IVHM) system to resolve equipment-fault related anomalies detected by cyber intrusion detection system (IDS). A benefit of the present system is that it can result in fewer alerts that need manual analysis. A combination of cyber and monitoring with integrated vehicle health management (IVHM) may be a high value differentiator. As a solution gets more mature through a learning loop, it may be customized for different customers in a cost effective manner, something that might be expensive to develop on their own for most original equipment manufacturers (OEMs). An IVHM symptom pattern recognition matrix may link a pattern of reported symptoms to known equipment failures. This matrix may be initialized from the vehicle design data but its entries may get updated by a learning loop that improves a correlation by incorporating results of investigations.

6 Claims, 7 Drawing Sheets

(51) Int. Cl.
*G06F 21/55* (2013.01)
*G06N 5/04* (2006.01)

(52) U.S. Cl.
CPC ...... *H04L 63/1425* (2013.01); *H04L 63/1433* (2013.01); *H04L 63/1441* (2013.01)

(56) References Cited

U.S. PATENT DOCUMENTS

| | | | |
|---|---|---|---|
| 2004/0176885 A1* | 9/2004 | Quinn | B60R 16/0234 701/33.4 |
| 2010/0052948 A1* | 3/2010 | Vian | G08G 1/01 340/963 |
| 2012/0304007 A1* | 11/2012 | Hanks | G05B 23/0216 714/26 |
| 2014/0074345 A1* | 3/2014 | Gabay | G07C 5/08 701/31.4 |
| 2015/0378339 A1 | 12/2015 | Ji | |
| 2017/0230410 A1 | 8/2017 | Hassanzadeh et al. | |
| 2018/0288080 A1* | 10/2018 | Keller | H04L 63/1425 |
| 2018/0288086 A1* | 10/2018 | Amiri | G06F 40/126 |
| 2018/0351980 A1* | 12/2018 | Galula | H04W 12/12 |
| 2019/0028493 A1* | 1/2019 | Endo | G06F 16/955 |
| 2021/0075807 A1* | 3/2021 | Park | H04L 63/029 |

* cited by examiner

FIG. 3

| IVHM known patterns Description | U0101 Invalid Input from Wheel Speed Sensor #1 | U0102 Invalid Input from Wheel Speed Sensor #2 | U0103 Invalid Input from Wheel Speed Sensor #3 | U0104 Invalid Input from Wheel Speed Sensor #4 | U0310 Invalid Vehicle Speed | U0320 Invalid Yaw Rate | U0201 ECM Bus Input Error | U0301 BCM Bus Input Error | U0401 ACC Bus Input Error | U0501 IC Bus Input Error |
|---|---|---|---|---|---|---|---|---|---|---|
| Internal fault in Wheel Speed Sensor #1 | X | | | | X | | | | | |
| Internal fault in Wheel Speed Sensor #2 | | X | | | X | | | | | |
| Internal fault in Wheel Speed Sensor #3 | | | X | | X | | | | | |
| Internal fault in Wheel Speed Sensor #4 | | | | X | X | | | | | |
| Wiring fault for Wheel Speed Sensor #1 | X | | | | X | | | | | |
| Wiring fault for Wheel Speed Sensor #2 | | X | | | X | | | | | |
| Wiring fault for Wheel Speed Sensor #3 | | | X | | X | | | | | |
| Wiring fault for Wheel Speed Sensor #4 | | | | X | X | | | | | |
| Internal Fault in ESC | | | | | X | X | X | | | |
| Wiring fault for ESC Transmit Connection | | | | | X | X | X | X | | |
| Wiring fault for ESC Input Connection | | | | | | | X | | | |
| Internal Fault in ECM | | | | | | | X | | | |
| Wiring fault for BCM Input Connection | | | | | | | | X | | |
| Internal Fault in BCM | | | | | | | | X | X | |
| Wiring fault for BCM Transmit Connection | | | | | | | | | X | |
| Wiring fault for ACC Input Connection | | | | | X | X | | | X | |
| Internal Fault in ACC | | | | | X | X | | | X | X |
| Wiring fault for IC Input Connection | | | | | | | | | | X |
| Internal Fault in IC | | | | | | | | | | X |

INTEGRATED EQUIPMENT FAULT AND CYBER ATTACK DETECTION ARRANGEMENT

This application claims the benefit of U.S. Provisional Patent Application 62/784,374, filed Dec. 21, 2018. U.S. Provisional Patent Application 62/784,374, filed Dec. 21, 2018, is hereby incorporated by reference.

This application claims the benefit of U.S. Provisional Patent Application No. 62/904,368, filed Sep. 23, 2019. U.S. Provisional Patent Application No. 62/904,368, filed Sep. 23, 2019, is hereby incorporated by reference.

BACKGROUND

The present disclosure may pertain to attacks on vehicle electronics and equipment failures of vehicles.

SUMMARY

The disclosure reveals use of an integrated vehicle health management (IVHM) system to resolve equipment-fault related anomalies detected by cyber intrusion detection system (IDS). A combination of cyber and monitoring with integrated vehicle health management (IVHM) may be a high value differentiator. As a solution gets more mature through a learning loop, it may be customized for different customers in a cost effective manner, something that might be expensive to develop on their own for most original equipment manufacturers (OEMs). An IVHM symptom pattern recognition matrix may link a pattern of reported symptoms (e.g., anomalies) to known equipment failures (electrical connections, sensors, controllers, known cyber-attacks, and so on). This matrix may be initialized from the vehicle design data but its entries may get updated by a learning loop that improves a correlation by incorporating the results of investigations.

BRIEF DESCRIPTION OF THE DRAWING

FIG. 3 is a diagram of a matrix containing integrated vehicle health maintenance (IHVM) known patterns of anomalies;

DESCRIPTION

Figure 1:
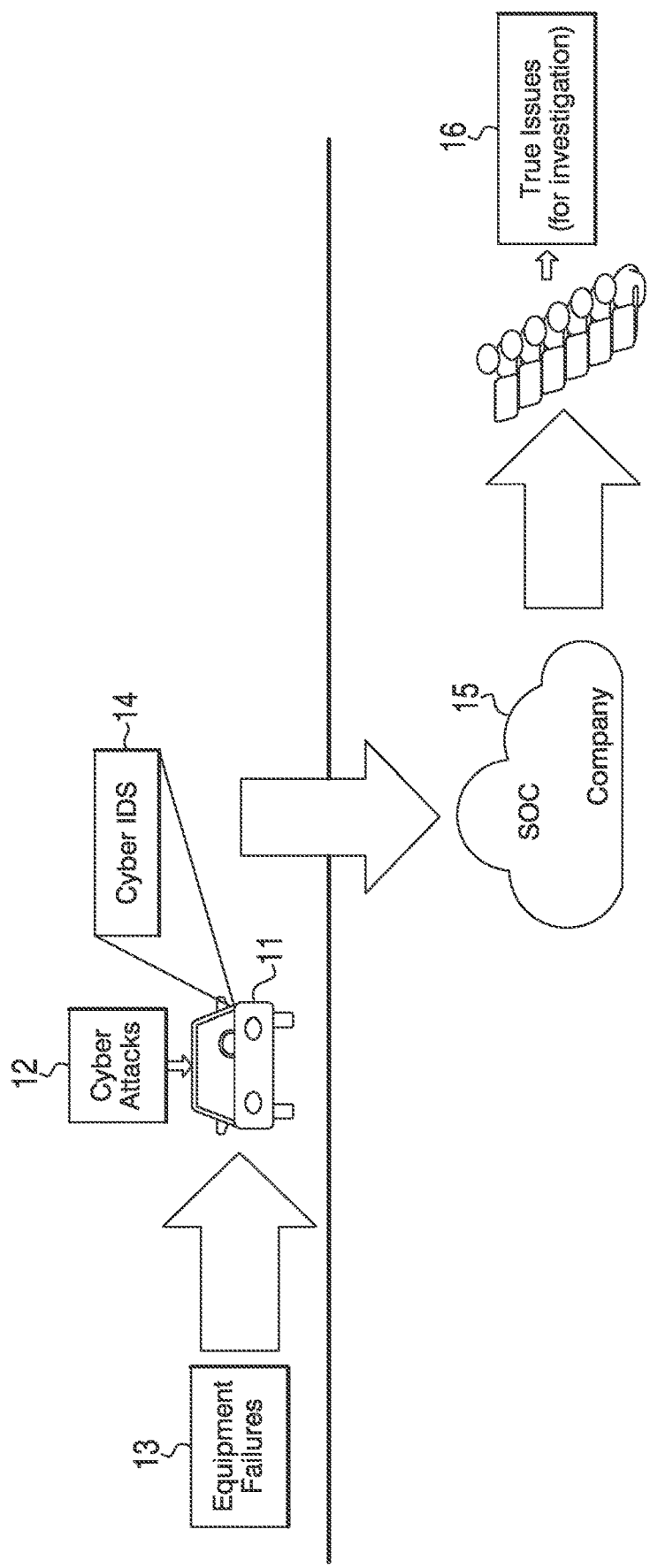
FIG. 1 is a diagram of a vehicle having some of its electronics subject to cyber-attacks, and also the vehicle may have equipment failures.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

Related art intrusion detection system (IDS) or intrusion detection and prevention systems (IDPS) may suffer from a high rate of false positives arising from monitoring a vehicle network for malicious activity. With an anomaly-based detection approach as the main strategy against cyber-attacks, machine learning may be used to model trustworthy or legitimate activity across the network and any deviation from this modeled behavior may be flagged as suspicious. This may imply that a previously unknown or unmodeled legitimate traffic can be wrongly marked as malicious. A vast majority of activities in current vehicles, perceived as anomalous by IDS/IDPS, may be caused by equipment failures (e.g., electrical connections, sensors, controllers, and so on) and are not cyber in nature. This may result in a deluge of anomalies reported by IDS/IDPS to a security operations center (SOC) which would need to be carefully examined by analysts before a small number of real cyber threats would be identified and dealt with. As expected, this exercise may be labor and time intensive and not ideal for cyber-attack monitoring, especially for a large fleet of vehicles. FIG. 1 is a diagram that illustrates a cyber false alarm issue statement. A cyber attack may be regarded as an attempt to damage, disrupt, or gain unauthorized access to a computer, computer system, or electronic communications network.

A combination of cyber and monitoring with integrated vehicle health management (IVHM) may be a high value differentiator. By combining cyber and IVHM offerings on the same vehicle data, the company may create a differentiated technology that does not exist yet. As a solution gets more mature through a learning loop, it may be customized for different customers in a cost effective manner, something that is expensive to develop on its own for most original equipment manufacturers (OEMs). The best IDS solutions in the market appear to achieve no lower than a ten percent rate for the false positives whereas a bar for validating the maturity of an IDS may be set at one percent or lower by the OEMs. By leveraging its expertise in IVHM to fine tune its IDS technology, the company may have an opportunity to meet this threshold sooner than its competitors in the cyber-security business. This disclosure has been developed to overcome the problems associated with an IDS and SOC alone solution that may be of a current state of the related art.

The present disclosure may indicate various approaches to create the IVHM portion of the model from design data and to integrate with patterns for cyber attacks.

FIGS. 2-5 may be diagrams of the present solution and/or system. An IVHM symptom pattern recognition matrix may link a pattern of reported symptoms (e.g., anomalies) to known equipment failures (electrical connections, sensors, controllers, known cyber-attacks, and so on). This matrix may be initialized from the vehicle design data but its entries may get updated by a learning loop that improves a correlation by incorporating the results of investigations. The model may be created from simulations and by collecting data during development testing of systems and the overall vehicle. Alternatively, a neural network or other machine learning based approach may also be utilized to detect equipment failures from an observed pattern of anomalies (FIG. 6). The neural network may be used as an alternate mechanism from the baseline reasoner and the matrix. If so, the neural network is not necessarily detecting, it is classifying/isolating. A predetermined set of features are extracted from the anomalies and fed to the input layer of a trained neural network. In the simplest case, these features could indicate the status of individual anomalies (0: absent, 1: present) themselves or could be more complex functions of anomalies. The output layer of the neural network may provide a probability associated with each known fault condition or equipment failure mode. If the highest probability at the output layer also happens to be above a certain threshold, the fault condition associated with it may be usually ascribed to the set of observed anomalies. This machine learning based model can be especially useful when sufficient or reliable design data are not available to initialize the IVHM matrix. The training data for a neural network or any other model may be gathered by injecting known failure modes and collecting all the anomalies from the IDS logs. In the description below, an IVHM matrix may be understood to represent a machine learning based model (e.g., neural network) and also for relating a pattern of anomalies to known equipment failures.

FIG. 1 is a diagram of a vehicle 11 having some of its electronics subject to cyber-attacks 12. Also, there may be equipment failures 13 in vehicle 11. A cyber IDS 14 may be associated with vehicle 11. It may be noted that equipment failures can be thousands of times more frequent than cyber-attacks; however, they can cause IDS anomalies. Signals from cyber IDS 14 may go to a SOC (security operations center) 15 of a company where many SOC analysts spend much time filtering through equipment failure reports looking for true cyber events. An output from SOC 15 may be true issues 16 identified for investigation.

Figure 2:
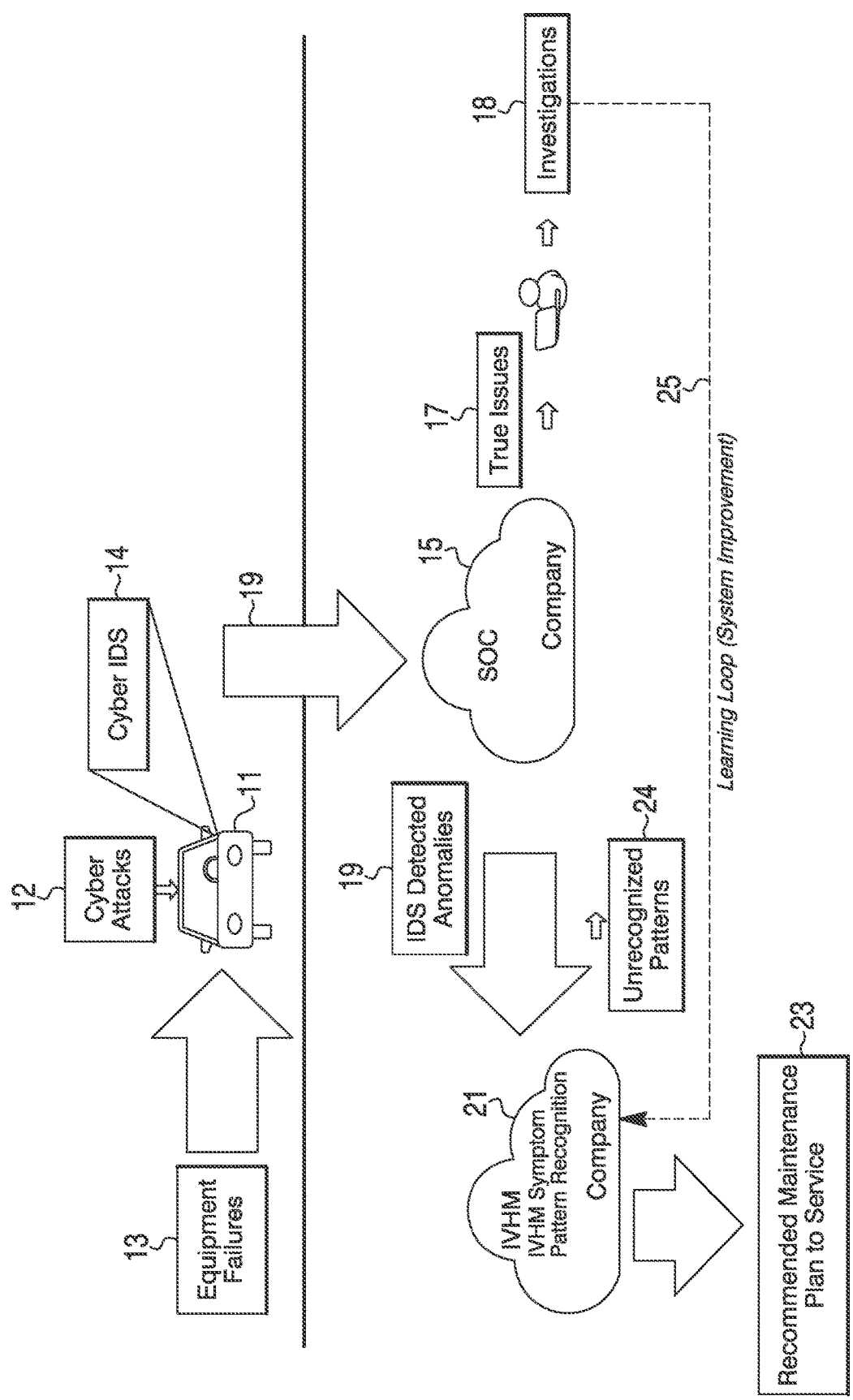
FIG. 2 may be a diagram of an onboard cyber intrusion detection system (IDS) that may detect virtually all of the anomalies and transmit them to a security operations center (SOC) hosted on a company cloud.

There are many ways to realize the disclosure. FIG. 2 may be a diagram of an onboard cyber IDS 14 that may detect virtually all of the anomalies and transmit them to an SOC 15 hosted on a company cloud. The anomalies may be rerouted to another company cloud with an IVHM 21 where they are fed to an IVHM known patterns matrix 22. Matrix 22 is shown in FIG. 3. If a link between a pattern of anomalies and a known failure is discovered, then it may be relayed to the service department as a recommended maintenance plan 23. The leftover or unrecognized anomalies 24 may be sent back to the SOC 15 where a human analyst goes through them to recognize any true cyber-attack issues 17, or a previously unknown design defect.

The findings of a human investigation 18 may be distributed to the stakeholders and form a learning loop 25 to improve IVHM 21 performance in the future.

A human is only involved in analysis of new, unrecognized events 24. The number of events that need a human analyst may be substantially reduced compared to cyber solution that does not automatically process the IVHM 21 related events. This approach does not necessarily attempt to automate the analysis of unrecognized events.

Again it may be said that FIG. 2 reveals a diagram of a cyber IVHM 21 (integrated vehicle health management) synergy solution. Vehicle 11 may be subject to equipment failures 13 and cyber-attacks 12. Cyber IDS 14 associated with vehicle 11 may provide signals 19 to SOC 15 which are forwarded to IVHM 21 of a company cloud or other place, where the anomalies 19 are analyzed and an IVHM symptom pattern recognition occurs. IVHM 21 may be regarded as a reasoner. IVHM 21 known patterns may be identified from a chart 22 in a diagram of FIG. 3. The patterns may be initialized from design data. An outcome from IVHM 21 may be a recommended maintenance plan 23 to service. Also, unrecognized patterns 24 may be sent by IVHM 21 to SOC 15 where analysts analyze equipment failure reports looking for true issues 17 that result in investigation 18 of them. Information from investigations 18 may go via a learning loop 25 for system improvement to IVHM 21.

Figure 4:
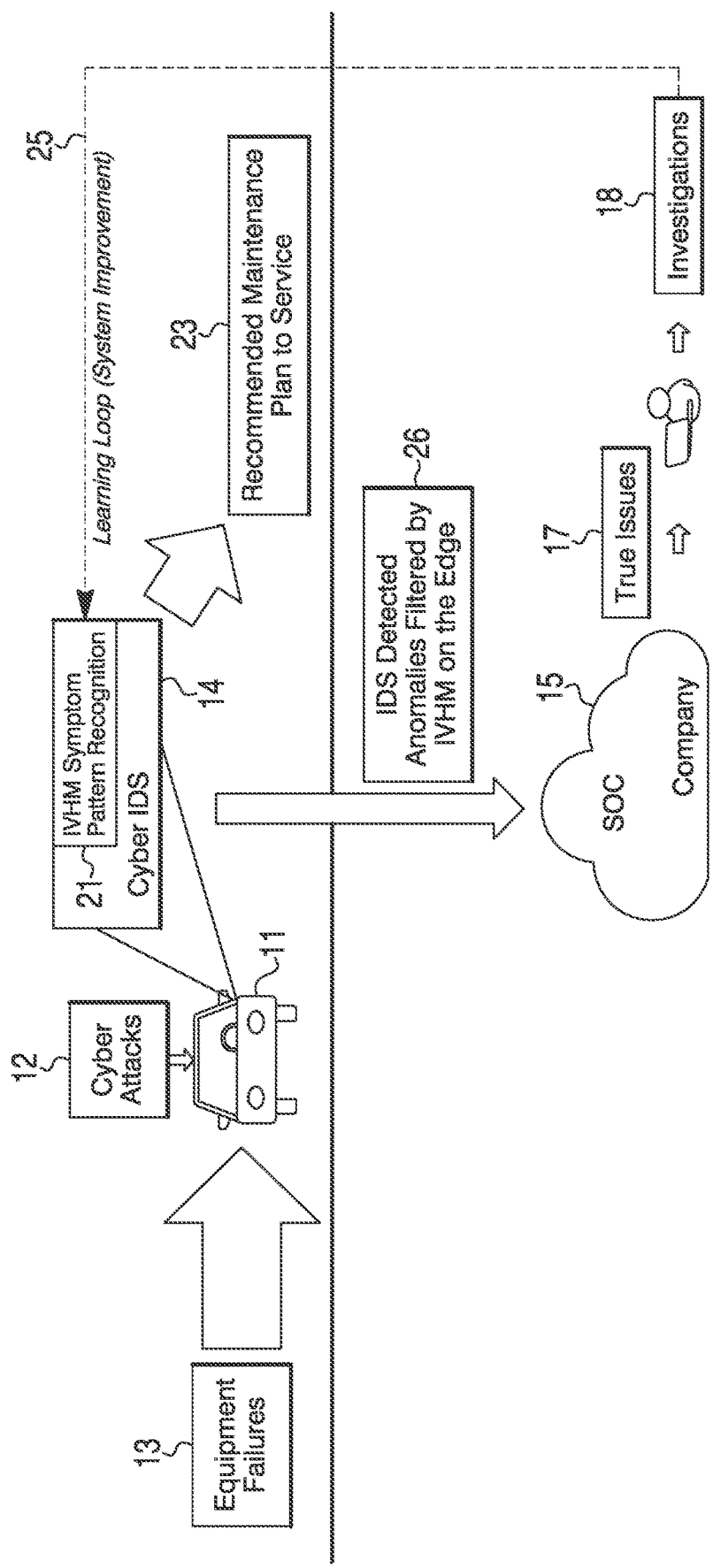
FIG. 4 is a diagram of an IVHM matrix that is deployed onboard and receives reported anomalies directly from the IDS.

FIG. 4 is a diagram of a realization that the IVHM matrix 22 may be deployed onboard and may receive the reported anomalies 19 from the IDS 14. Once unrecognized symptoms are sorted out, they may be transmitted to the SOC 15, hosted on a company cloud, and monitored by a human analyst. A learning loop 25 and IVHM findings of unrecognized patterns 24 that may be dealt with in a manner similar to an earlier version (FIG. 2). This solution may have an advantage of reducing the amount of data transfer and handling among different servers, and thus have cost and security benefits, over the realization in FIG. 3. However, incorporating an IVHM 21 onboard (i.e., an edge or an ECU) is another configuration.

The diagram of FIG. 4 with the described configuration may be of a cyber IVHM synergy solution. Vehicle 11 may have cyber-attacks 12 and equipment failures 13. Cyber IDS 14 may detect equipment failures 13 and cyber-attacks 12. Cyber IDS 14 may incorporate IVHM 21 symptoms pattern recognition of signals or information detected by cyber IDS 14, according to chart 22 of known patterns. One output from cyber IDS 14, as accompanied by IVHM 21, may be a recommended maintenance plan 23 to service. Also from cyber IDS 14 may be IDS detected anomalies 19 filtered by IVHM 21 on an edge 26. The unrecognized anomalies 24 may go to SOC 15 which pulls out true issues 17 that may result in investigation 18. Learning loop 25 may carry discovered information from investigations 18 to IVHM 21 for system improvement.

Figure 5:
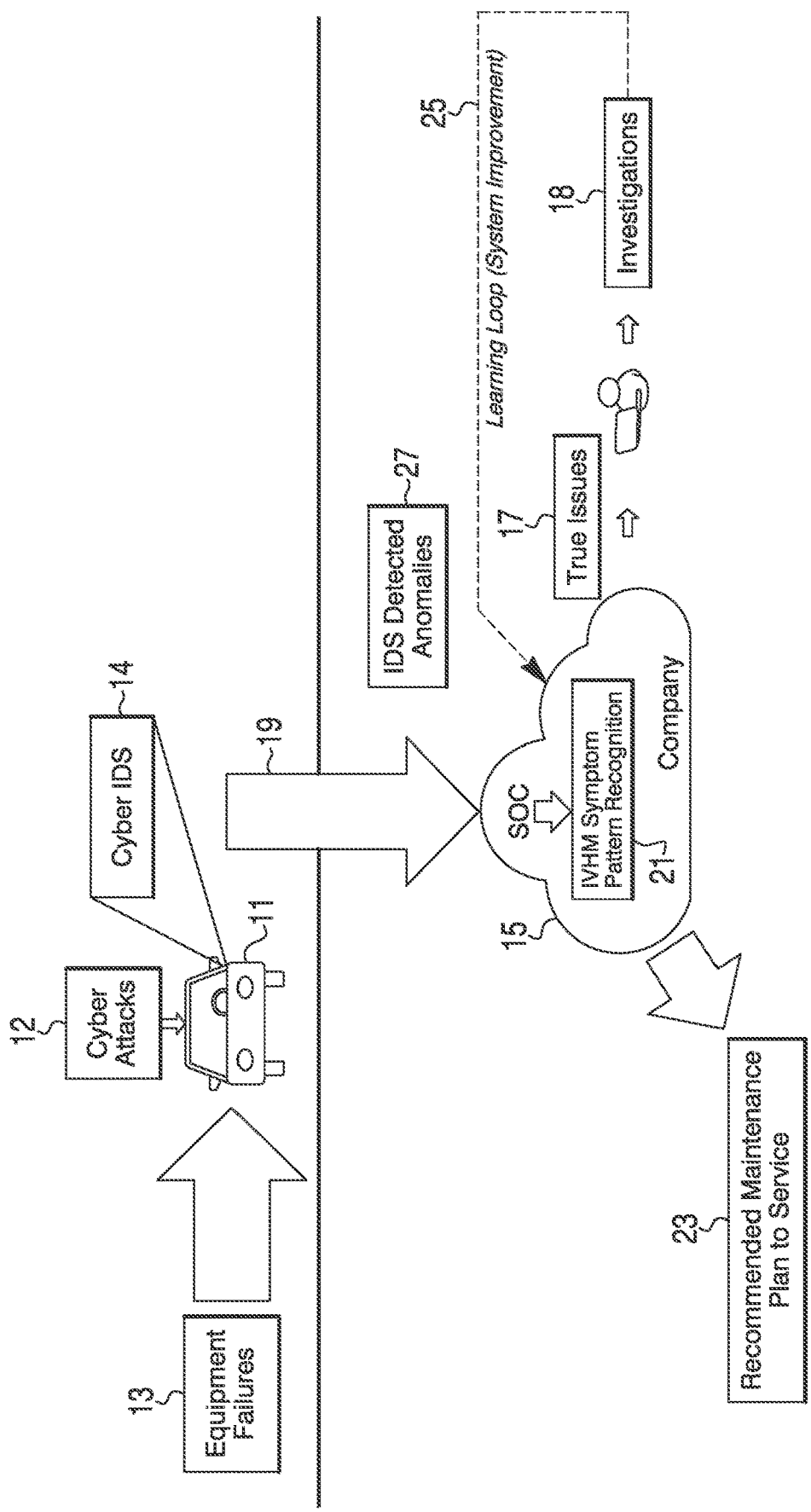
FIG. 5 is a diagram of the IVHM matrix that may be hosted with the SOC in the same cloud.
Figure 6:
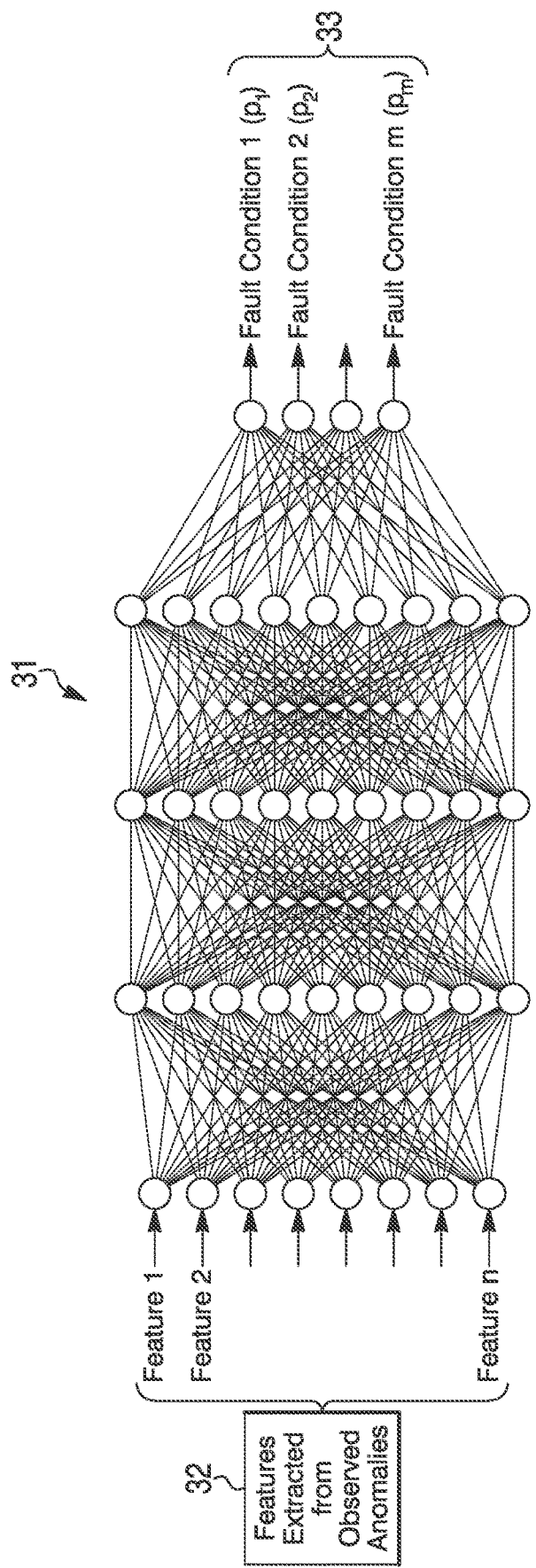
FIG. 6 is a diagram of a neural network which may be an alternative approach for initializing a fault model or performing a fault isolation process.

FIG. 5 may be a diagram of a solution that is similar to the solution presented in FIG. 2 but the IVHM 21 matrix 22 may be hosted with SOC 15 in the same company cloud. It may receive all of the reported anomalies from SOC 15 and sort them into two bins, as before, those associated with known failures or patterns and the unrecognized ones 24. Rest of data handling may be the same as the previous realizations.

The diagram of FIG. 5 of still another configuration of the cyber IDS 14 IVHM 21 synergy solution. Vehicle 11, as noted above, may be subject to cyber-attacks 12 and equipment failures 13. Cyber IDS 14 may send IDS detected anomalies to SOC 15, which in turn relays the anomalies to IVHM 21 for symptom pattern recognition according to chart 22. One outcome may be a recommended maintenance plan 23 to service. Another outcome may be true issues 17 that lead to investigations 18. Information from investigations may follow a learning loop to SOC 15 and IVHM 21 for system improvement.

The present system may have one or more software components. A stack level may be a cloud to provide a secure, scalable infrastructure for collecting, aggregating and storing data, allowing connected "things" to communicate, offering/SaaS solution available, IaaS/PaaS, data lakes. A software type may be connected/connectivity as an offering available through a cloud or a direct remote connection (SaaS) or may cover an infrastructure enabling connected services (sentience). It may have an IoT (Internet of Things). There may be an IoT with a stack level such as an edge, i.e., a hardware device with embedded software that can be connected securely to the cloud via a wire or wireless connection. It may generate or capture data. The type of data may be anomalies in the vehicle network, and may reside on the edge (onboard) or on a cloud.

FIG. 6 is a diagram of a neural network based approach for equipment failure detection. To the left are indicated features extracted from observed anomalies to the network. To the right are fault conditions indicated from the network.

A neural net is not necessarily used to initialize the fault model or to perform the fault isolation process, though it may be incorporated as an alternate implementation.

Figure 7:
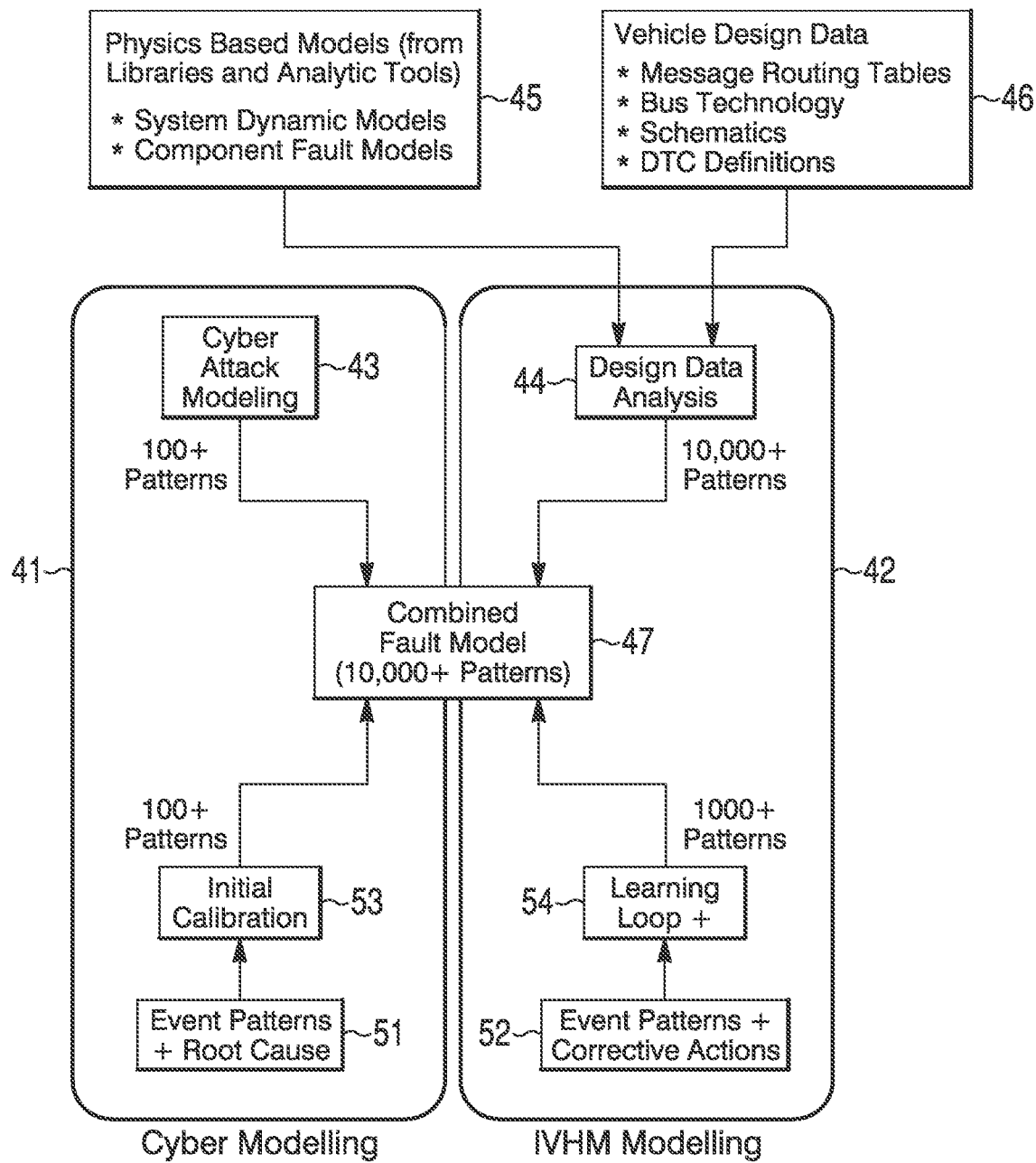
FIG. 7 is a diagram of a fault model that may be initialized for a combined cyber and IVHM system.

FIGS. 6 and 7 may have or show elements that particularly fit in to the diagrams of FIGS. 2-5. For instance, content of the combined fault model is illustrated in FIG. 3. It may also be called out as the table of IVHM known patterns in FIG. 2. The combined fault model may then be used in the IVHM symptom pattern recognition function that is included in FIGS. 4 and 5.

FIG. 6 is a diagram of a neural network 31 for equipment failure detection. Features may be extracted from observed or detected anomalies 31, which are like detected anomalies 27 of the previous figures. Features 32 (1-n) may be processed with network 31 to derive fault conditions 33 (1-m ($p_1$-$p_m$)).

A critical aspect of the present system is the mechanism by which the fault matrix may be derived from design data. A key element is to combine physics based models encoding the failure modes of individual components and models of system dynamics with design data for particulate vehicles. There may an integration of results from simulations and design testing.

The diagram of FIG. 7 is a fault model initialized for a combined cyber and IVHM system. It may indicate model creation and updates. The cyber model may include representations of each type of attack and expected symptom patterns for each. This model may be calibrated during development testing. The IVHM model may use design data to produce the expected symptom patterns for each type of equipment failure. The model may be improved through a learning loop as actual events occur and are corrected. The IVHM model may have about 100 times more content than the cyber model. Initializing a fault model from design data and physics based models may greatly reduce the amount of training data required, provide a faster path to system maturity and substantially lower an overall system cost.

FIG. 7 is a diagram of a fault model that may be initialized. A layout 41 may be set forth for cyber modeling. A layout 42 may be set forth for IVHM modeling. Layout 41 may have a cyber-attack modeling component 43 where 100+ patterns are generated. Layout 42 may have a design data analysis component 44 where 10,000+ patterns are generated. An input 45 to design data analysis component 44 may incorporate physics based models (from libraries and analytic tools, including system dynamic models and component fault models). Another input 46 to design data analysis component 44 may include vehicle design data (from message routing tables, bus topology, schematics, and diagnostic trouble code (DTC) definitions). There may an integration of results from simulations and design testing. The outputs of 10,000+ patterns from cyber-attack modeling component 43 and design data analysis component 44 may go to a combined fault model 47. An output of FIG. 7 may be the combined fault model 47.

An input 51 of event patterns plus root cause may go to an initial calibration component 53. An input 52 of event patterns plus corrective actions may go to a learning loop+ component 54. An output of 100+ patterns from initial calibration component 53 may go to combined fault model 47. Another output of 1000+ patterns from learning loop+ component 54 may go to combined fault model 47. Thus, component 47 may deal with a combined fault model with four inputs of patterns.

FIG. 7 illustrates the functionality of two blocks that utilize machine learning. The initial calibration function uses machine learning to initialize the IDPS anomaly detection function and to record the pattern of alerts expected for each type of cyber attack. The learning loop function may use machine learning to update the patterns in the combined fault model to more accurately reflect the pattern of alerts for all events observed during tests and by the production fleet.

A use of health indicators produced by cyber security operations center may improve diagnostic accuracy. An integrated vehicle health management (IVHM) may be used to complement the functionality of a cyber security system in order to reduce the number of false alarms by identifying symptom signatures that are similar to the symptom signatures produced by known equipment faults. This may solve the issue of incurring the costs of servicing the high number of cyber alerts that are caused by equipment failures. However, this solution may cause a new issue in that events that are actually being caused by a cyber attack could be forwarded to a dealer or dealers for maintenance without any visibility by a security operations center (SOC).

This approach may add an additional layer of logic that has certain fleet analytics run by the SOC regardless of an IVHM classification in order to detect event frequency spikes that are much more indicative of a Cyber Attack than for normal equipment failure occurrences. When this logic detects a spike, the SOC may send one or more Health Indicators to the IVHM which inform IVHM of the affected Fleet and affected electronic control units (ECUs). The logic may also be used to produce an alert in the SOC that a likely attack has been detected. IVHM will use this information in its ranking algorithms with the effect that the Cyber Attack is prioritized as the most probable cause of any diagnostic trouble codes (DTCs) or customer complaints related to the identified ECU malfunctions.

The present approach may consist of a mechanism to detect a spike in the frequency of the Indicators that it is sending to the IVHM for a single fleet and ECU combined with a notification to the SOC when such a spike is detected and an approach to change the IVHM produced rankings for the Fault Conditions related to the Indicators with an abnormally high frequency. The ranking algorithms may provide the specified behavior by including the Health Indicators produced by the SOC in the combined IVHM+cyber fault model.

Elements of the present approach may include: 1) A mechanism to suppress nuisance messages to cyber analysts based on similarity to signatures of known equipment failures; 2) A mechanism to detect potential vehicle attacks using fleet level statistics based on frequency and location concentrations of events; and 3) A mechanism to integrate the results of items 1 and 2 to more accurately determine the likelihood that the event is an equipment failure or a cyber-attack.

The present approach may further include a development of a common fault model that incorporates signatures for equipment failures and for the cyber attacks and a reasoner that can use the model and the states of the reported indicators to diagnose a cause of an event.

To recap, an integrated equipment fault and cyber attack detection arrangement may incorporate an intrusion detection system (IDS) for sensing cyber attacks and equipment failures upon a vehicle, a security operations center (SOC) connected to the IDS for receiving cyber attacks and equipment failures, and an integrated vehicle health management (IVHM) module connected to the SOC to process the cyber attacks and equipment failures. The cyber attacks and equipment failures may be regarded as anomalies. Detected anomalies having patterns from the IDS may be passed on by the SOC to the IVHM module for pattern recognition. Patterns unrecognized by the IVHM module may be sent to the SOC for analysis. The patterns that are unrecognized may be investigated, and then results can be passed from an investigation via a learning loop to the IVHM module. Patterns recognized by the IVHM module may result in a recommended maintenance plan.

The detected anomalies may include an abnormal frequency of events reported by the SOC to the IVHM module.

The IHVM module may be updated or improved with the results via the learning loop.

The IVHM module may output a recommended maintenance plan to service damage or prevent damage from cyber attacks or equipment failures.

The investigation may be performed by a human.

The IVHM module may compare patterns of detection anomalies passed on from the SOC, with known patterns in storage of the IVHM module for identifying issues.

The pattern storage of the IVHM module may be updated with new or unrecognizable patterns via the learning loop.

Updating the pattern storage of the IVHM module may be effected with machine learning.

An approach for intrusion detection may incorporate detecting cyber attacks and equipment failures upon a vehicle, reviewing anomalies having patterns from one or more detected cyber attacks or equipment failures identified at an integrated vehicle health maintenance (IVHM) module with a symptom pattern recognition device, detecting issues from reviewing the anomalies having unrecognized patterns, and investigating the issues of unrecognized patterns and sending information to the IVHM module for improvement or updating of the system pattern recognition device.

The unrecognized patterns may be reviewed at a security operations center (SOC).

The IVHM module, in response to the review of the recognized patterns, may recommend a maintenance plan for servicing a vehicle having possible damage by one or more cyber attacks or equipment failures according to a recognized pattern.

The unrecognized patterns may have issues that are analyzed or investigated by a human.

One or more results of an analysis or investigation categorized as system improvement may be sent back on a learning loop as information for improvement of the system pattern recognition device.

The learning loop may use machine learning to update the patterns used by the system pattern recognition device.

The system pattern recognition device may incorporate a table of known patterns.

A neural net may be alternatively implemented in lieu of the table of known patterns. A predetermined set of features may be extracted from the anomalies and fed to an input layer of the neural net.

A mechanism for developing a fault model, may incorporate a cyber modelling module, and an integrated vehicle health management (IVHM) modeling module. The cyber modelling module and the IVHM modelling module may be combined together to output a combined fault model.

The cyber modelling module may incorporate representations of each type of attack and expected symptoms for each attack. The IVHM modelling module may use design data to produce expected symptom patterns for each type of equipment failure.

The combined fault model may incorporate an input of cyber attack modelling, an input of initial calibration of the cyber modelling module, an input from a design data analysis module, and an input of a learning loop.

The design data analysis module may incorporate physics based models including system dynamic models and component fault models, vehicle design data including message routing tables, bus topology, schematics and diagnostic trouble code (DTC) definitions, and results of simulations or tests.

The initial calibration may have an input of event patterns and a root cause. The learning loop may have an input of event patterns and corrective actions.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. An integrated equipment fault and cyber attack detection arrangement comprising:
    a hardware intrusion detection system (IDS) for sensing cyber attacks and equipment failures upon a vehicle;
    a security operations center (SOC) connected to the hardware IDS for receiving cyber attacks and equipment failures; and
    an integrated vehicle health management (IVHM) hardware module connected to the SOC to process the cyber attacks and equipment failures;
    wherein the hardware IDS, SOC and IVHM hardware module are configured to operate as follows:
        the cyber attacks and equipment failures are regarded as anomalies and reported by the hardware IDS to the SOC;
        detected anomalies from the hardware IDS are passed on by the SOC to the IVHM hardware module for pattern recognition;
        the IVHM hardware module analyzes the passed on anomalies to recognize patterns in the passed on anomalies and thereby segregate known equipment failures from unrecognized anomaly patterns;
        the IVHM hardware module generates a recommended maintenance plan for recognized patterns in the anomalies associated with known equipment failures;
        the IVHM hardware module sends any unrecognized anomaly patterns to the SOC for analysis;
        the unrecognized anomaly patterns are investigated at the SOC and, if the unrecognized anomaly patterns are investigated resulting in a new equipment failure pattern, the IVHM hardware module is configured to receive the new equipment failure pattern and use the new equipment failure pattern to recognize future equipment failures.

2. The arrangement of claim 1, wherein the detected anomalies include an abnormal frequency of events reported by the SOC to the IVHM hardware module.

3. A method for intrusion detection comprising:
- detecting cyber attacks and equipment failures upon a vehicle;
- reporting the detected cyber attacks and equipment failures from the vehicle as anomalies to a security operations center (SOC) for a fleet of vehicles;
- passing the anomalies from the SOC to an integrated vehicle health maintenance (IVHM) hardware module configured to identify patterns of anomalies associated with known equipment failures;
- at the IVHM hardware module, determining whether any patterns of anomalies match known equipment failures, and, if so, removing such anomalies and generating maintenance plans for any such known equipment failures;
- returning, from the IVHM hardware module to the SOC, any anomalies having unrecognized patterns;
- investigating the anomalies having unrecognized patterns to identify either a cyber attack or a new equipment failure pattern; and
- if a new equipment failure pattern is identified, sending information to the IVHM hardware module to add to a list of known equipment failures and associated anomaly patterns.

4. The method of claim 3, wherein the unrecognized patterns are reviewed at the security operations center (SOC).

5. The method of claim 4, wherein: the unrecognized patterns have issues that are analyzed or investigated by a human.

6. The method of claim 3, wherein the IVHM hardware module comprises a table of known patterns relating to known equipment failures.

* * * * *